No. 792,706. PATENTED JUNE 20, 1905.
H. E. IRWIN.
VEHICLE WHEEL.
APPLICATION FILED NOV. 11, 1903.
2 SHEETS—SHEET 2.
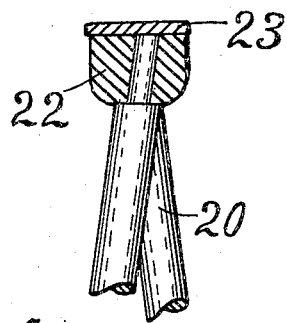
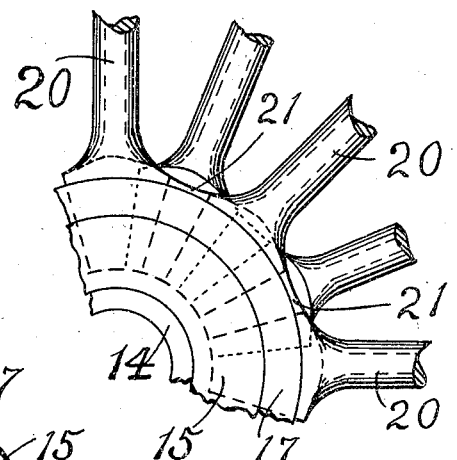
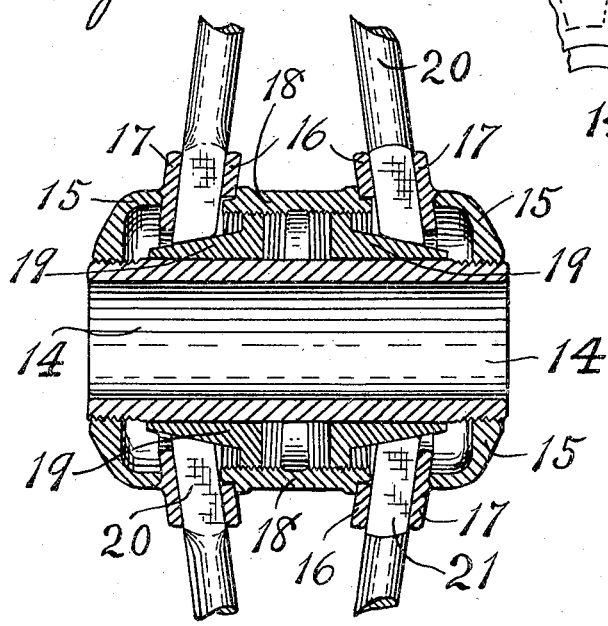
Witnesses:
Geo. F. Swenson
H. J. McMillan
Inventor:
Herbert E. Irwin No. 792,706.

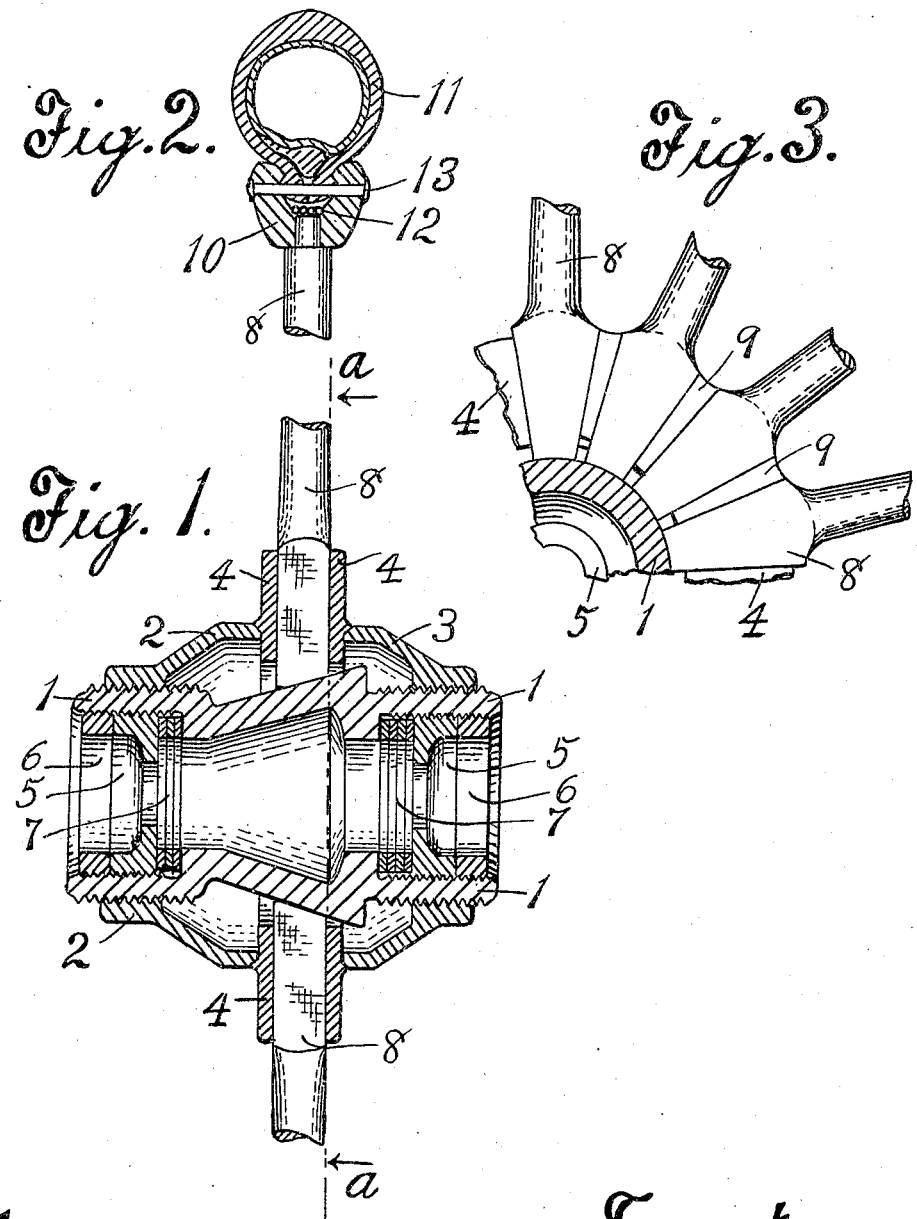

Patented June 20, 1905.

UNITED STATES PATENT OFFICE.

HERBERT E. IRWIN, OF GALESBURG, ILLINOIS.

VEHICLE-WHEEL.

SPECIFICATION forming part of Letters Patent No. 792,706, dated June 20, 1905.

Application filed November 11, 1903. Serial No. 180,656.

*To all whom it may concern:*

Be it known that I, HERBERT E. IRWIN, a citizen of the United States, residing at Galesburg, in the county of Knox and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle-wheels, and has especial reference to certain improvements in the construction of hubs and the application of spokes thereto.

The primary object of my invention is to construct a wheel so that the spokes when loose may be tightened by simply the application of a wrench, thereby avoiding the loss of time and expense incident to the resetting of a tire upon a wheel.

Another object of my invention is to construct an adjustable spoked wheel which will permit the use of a special one-part channeled wood rim.

A further object of the invention is to construct a wheel having adjustable staggered spokes.

Another object of the invention is to construct an adjustable spoked wheel, whereby its repairing is facilitated.

Still another object of my invention is to construct an adjustable spoked wheel to prevent it from bowing, which is often caused by the shrinking of the metallic tire too tightly upon the wheel.

These and such other objects as shall hereinafter appear are attained by the devices shown in the accompanying drawings, in which—

Figure 1 represents a vertical longitudinal section of a wheel-hub with a portion of the spokes shown in side elevation; Fig. 2, a cross-section of a rim and pneumatic tire with the outer end of a spoke shown in side elevation engaged therewith; Fig. 3, a vertical cross-section on line *a a*, Fig. 1; Fig. 4, a vertical longitudinal section of a wheel-hub with a portion of the staggered spokes shown in side elevation; Fig. 5, a cross-section of a wood felly and metallic rim with the ends of the staggered spokes shown in side elevation; Fig. 6, an end view of the hub and spokes shown in Fig. 4.

Reference being had to the drawings and numerals thereon, 1 indicates the inner section or main part of a wheel-hub possessing a conically-shaped center and having outer threaded portions, with which engage concentric threaded collars 2 and 3, which in turn abut against side retaining-rings 4, the same being used to receive and support spokes 8, the bases of which rest upon the conically-shaped portion of section 1. The ends of section 1 have threads on their inner sides, with which ball-cups 5 engage, which possess lock-nuts 6. Washers 7 are placed between ball-cups 5 and abutments on section 1. Wedges 9 are driven in between the spokes and are used to give them a firm seating in the hub. The outer ends of spokes 8 engage a one-part channeled wood rim 10, which has wire 12 wrapped in its channel. The wood rim is strengthened by rivets 13.

11 is a detachable double-tube tire, which is not a part of this invention.

Referring to the staggered spoked wheel, 14 indicates the inner tubular section or main part of the wheel-hub, the ends of which are provided with exterior threaded portions, which engage concentric collars 15. 18 is a cylinder having inner right and left hand threads adapted to engage conically-shaped sleeves 19, which rest upon the inner section 14. Cylinder 18 and collar 15 abut against side retaining-rings 16 and 17, which conform to the general direction of the staggered spokes 20, the bases of which rest upon the conically-shaped surfaces of sleeves 19. Wedges 21 are arranged to fit in between the spokes. The wheel is provided with an ordinary wood felly 22, having a metallic tire 23 fitted thereon.

Referring to the type of wheel shown in Fig. 1 and assuming that the spokes need tightening, I first apply a suitable wrench to collar 3 and slack it back and then apply a wrench to collar 2 and force the spokes up the incline on section 1 until they are properly tightened, when I can tighten up collar 3 and force ring 4 tightly against the spokes. In making this adjustment it will be observed that the spokes move sidewise, which would destroy the proper tracking of the wheel. To overcome this objection, I have provided adjustable ball-cups, which may be moved in or out by taking washers 7 out of one end and putting them in the other. The washers may be placed between the ball-cup and the ball-cup lock-nut. These ball-cup adjustments will effect the proper gage for the wheels.

The nature of the wheel bearing or journal is not a feature of this invention, as any suitable type may be used.

I have shown in Fig. 4 an adjustment whereby staggered spokes may be tightened in a wheel. This adjustment is effected by slacking off the collars 15 and applying a wrench to cylinder 18, which will force the conically-shaped sleeves 19 apart and the spokes out. The collars 15 may then be tightened again.

I preferably do not use bolts in the construction of my wheel, as nuts are likely to lose off, and a much neater looking wheel can be made without them.

Heretofore a one-part channeled wood rim, such as I have shown in Fig. 2, was only applicable to a wire-spoked wheel; but with my adjustable spoked wheel such a rim may be used in connection with wood-spoked wheels. Wheels having endless solid-rubber or pneumatic tires also require wheels of a given diameter, so that wheels of this description heretofore when loose could not be tightened without destroying the value of the tire or rim. It will therefore be seen that an adjustable spoked wheel is very essential to a one-part wood rim or an endless rubber tire. I have placed wire 12 within the channel of the one-part wood rim to prevent its expanding when the spokes were being tightened by the adjustable hub.

The usual practice in tightening a wheel when loose has been to remove the metallic tire, shorten it, and to place it hot on the felly, thus making the wheel smaller and which sometimes has the effect of bowing it. While this practice is fairly satisfactory, it requires considerable time and expense. It is very difficult to reset metallic channeled tires with rubber tires thereon, especially when the rubber tires are somewhat worn, as they are likely to be spoiled when being replaced. With a wheel equipped with my spoke adjustment the time, labor, and expense required to repair the wheel is reduced to a minimum.

I do not restrict myself to the material used in the spokes. The spokes may be solid metallic or tubular metallic; but I prefer wood ones.

Having thus described my invention, what I claim, and desire to secure by Letters Patent, is—

1. In a vehicle-wheel, the combination with the spokes, of a hub having a concentric section therein provided with a tapering surface thereon, the bases of the spokes being arranged to rest upon the said tapering surface, means for forcing the spokes up the incline of the tapering surface whereby said spokes may be tightened in the wheel, and wedges separating the spokes wholly from each other and operating longitudinally toward the center of the hub when taking up play between the spokes, substantially as described.

2. In a vehicle-wheel, the combination with the spokes, of a hub having a tapering section therein adapted to support said spokes, collars arranged to abut against retaining spoke-rings, and wedges lying between the said retaining-rings between the spokes preventing said spokes wholly from touching each other and operating longitudinally toward the center of the hub when taking up play between the spokes, substantially as described.

3. In a vehicle-wheel, the combination with the spokes, of a hub provided with a tapering section, the bases of the spokes being arranged to rest upon the said tapering section, the said wheel having a channeled wood rim with wire wrapped therein so that when the spokes are forced up the incline on the tapering section the rim is prevented from expanding, substantially as described.

4. In a vehicle-wheel, the combination with the spokes, of a hub having a tapering sleeve, the bases of the said spokes being arranged to rest upon the tapering sleeve, and means for moving said sleeve laterally whereby the spokes are forced radially outward and are tightened in the wheel, the inner ends of said spokes being wholly separated by wedges arranged to operate longitudinally toward the center of the hub when taking up play between the spokes, substantially as described.

5. In a vehicle-wheel, the combination with the spokes, of a hub provided with two concentric sleeves having conically-shaped surfaces thereon, the bases of said spokes being arranged to rest upon the said surfaces, and means for forcing the spokes up the incline on said sleeves whereby the spokes may be tightened in the wheel, substantially as described.

6. In a vehicle-wheel, the combination with staggered spokes, of a hub provided with two concentric conically-shaped sleeves, the bases of said spokes being arranged to rest upon the surfaces of said sleeves, and means for forcing the spokes up the incline on the conically-shaped sleeves whereby the spokes may be tightened in the wheel, substantially as described.

7. In a vehicle-wheel, the combination with the spokes, of a hub comprising an inner tubular section, outer concentric collars, retaining-rings for the spokes, two conically-shaped sleeves and a cylinder engaging said sleeves, so that by revolving the cylinder the conically-shaped sleeves are forced apart thereby tightening the spokes in the wheel, substantially as described.

In testimony whereof I affix my signature in presence of two witnesses.

HERBERT E. IRWIN.

Witnesses:
A. S. HAMILTON,
J. H. LOSEY.